United States Patent [19]

Engelking

[11] Patent Number: 4,824,051

[45] Date of Patent: Apr. 25, 1989

[54] ORBITAL SYSTEM INCLUDING A TETHERED SATELLITE

[75] Inventor: Uwe Engelking, Bonn, Fed. Rep. of Germany

[73] Assignee: Agence Spatiale Europeenne, Paris, France

[21] Appl. No.: 2,034

[22] Filed: Jan. 12, 1987

[30] Foreign Application Priority Data

Jan. 16, 1986 [FR] France ................................. 86 00540

[51] Int. Cl.$^4$ .............................................. B64G 1/10
[52] U.S. Cl. ................................ 244/158 R; 244/172; 244/164
[58] Field of Search ................... 244/158 R, 164, 167, 244/172

[56] References Cited

U.S. PATENT DOCUMENTS

| | | | |
|---|---|---|---|
| 3,241,142 | 3/1966 | Raabe | 343/100 |
| 3,532,298 | 10/1970 | Swet | 244/167 |
| 3,582,016 | 6/1971 | Sherman | 244/167 |
| 4,083,520 | 4/1978 | Rupp et al. | 244/167 |
| 4,097,010 | 6/1978 | Colombo et al. | 244/158 R |
| 4,580,747 | 4/1986 | Pearson | 244/158 R |

OTHER PUBLICATIONS

Astronautics & Aeronautics, Apr. 1983, pp. 33–40; I. Bekey: "Tethers Open New Space Options".
Journal of Spacecraft, vol. 20, No. 3, May–Jun. 1983, pp. 238–244; S. D. Shawhan and al.: "Subsatellite Studies of Wave, Plasma, and . . .".
Aviation Week & Space Technology, Dec. 20, 1982, pp. 60–63; A. Randolph: "Martin Awaits Go-Ahead for Tethered".
AIAA/SAE/ASME, 20th Joint Propulsion Conference, Jun. 11–13, 1984; Carrol et al.: "Potential Role of Tethers in Space Transportation".

Primary Examiner—Galen Barefoot
Assistant Examiner—Rodney Corl
Attorney, Agent, or Firm—Kenyon & Kenyon

[57] ABSTRACT

An orbital system comprising a main platform and a satellite tethered by a long cable which may be used to perform measurements in the upper layers of the atmosphere. Air drag on the satellite causes the orbit parameters to decay, and means of regenerating the orbit parameters by electro-dynamic propulsion are provided. The cable is electrically conductive and, in a propulsion configuration, a current is passed through the cable to provide electro-geomagnetic thrust. Winches enable the cable to be wound in and out, either constantly, or in synchronization with angular oscillation of the system to damp the oscillations.

On an east-bound orbit, the satellite may be transferred from a measurement configuration, where it is below the platform, to a propulsion configuration, where it is above the platform. This is achieved by winding the cable in synchronism to excite the oscillations until it swings above the platform and then to damp the oscillations so that it remains above the platform. The opposite transfer is obtained symmetrically.

15 Claims, 3 Drawing Sheets

4,824,051

ORBITAL SYSTEM INCLUDING A TETHERED SATELLITE

BACKGROUND OF THE INVENTION

This invention relates to an orbital system comprising a main platform, such as a main satellite or a launcher, which may be a space shuttle, and a secondary satellite which may be deployed from the platform, the deployed secondary satellite being connected to the platform by a very long tether cable. The secondary satellite may be used as a measurement probe for the upper atmosphere, at an altitude between 100 and 150 km.

DESCRIPTION OF THE PRIOR ART

An orbital system of this kind is described by Colombo and Grossi in U.S. Pat. No. 4,097,010. In this prior art system, the probe is connected to a powered space platform by a cable of a length of 100 km or more. The development of the platform-cable-probe system is performed by ejecting the probe from the platform with an initial speed along the local vertical, in combination with the effects of gravity gradient and the drag of the probe when it starts to enter the upper atmospheric layers.

However, as noted in the U.S. patent mentioned above, the drag experienced by the probe as it travels in the upper layers of the atmosphere cause degeneration of the deployed systems orbit and the degeneration is substantial after a few orbital revolutions only, when the probe orbits at about 150 km altitude. In this patent, which relates to a satellite connected to a powered spacecraft, this degeneration is compensated by using the spacecraft thrusters. Now, the thrusters of a spacecraft and in particular of the spacecraft available at present such as the U.S. space shuttle imply consumption and therefore storage of fuel, and the autonomy of the system is limited by the load carrying capacity of the space shuttle, that is to say the payload mass.

It is possible to use the high density of electrons and ions in the $F_2$ layer of the ionosphere (between 250 and 600 km altitude) to obtain orbital propulsion using a long electrically conductive cable. Thus, according to theory, an electric current produced in the cable generates, by interaction with the earth's geo-magnetic field, an electro-dynamic force F according to the equation:

$$-\vec{F} = i\vec{1n} \times \vec{B} \qquad (1) \text{ (see FIG. 2)}$$

where $\vec{B}$ is the magnetic flux, $\vec{1n}$ is the length of cable extending from the probe to the platform and i the electric current, positive in the direction from the probe to the platform. The electrical energy could be provided from the main platform, which contains the equipment and the energy source.

This principle of propulsion is particularly described in an article entitled "Potential Role of Tethers in Space Transportation" in the "AIAA Paper 84–1448". The authors of this article show that the propulsion function of a cable under electro-dynamic forces can be achieved for a satellite travelling in a sufficiently strong magnetic field, as is the case with the earth. The article specifies that many problems remain to be solved before exploiting such a propulsion method, particularly:

the means for coupling the cable with the surrounding plasma: in fact the electrical circuit including the cable is closed by a return path through the plasma in the ionospheric layer. The passage of electrons between the orbital system and the plasma environment and back is enabled by use of an electron gun at one end of the cable and a metallized balloon acting as a collector for electrons at the other end. The function of such couplings still has to be ascertained and also the conductivity of the plasma.

the materials of the cable: they must present a high breakage strength and adequate reliability in an environment where they are subjected to the impact of micro-meteorites, and this may be obtained using multi-thread ribbon of Kevlar fibers or high-density polyethylene fibers.

the behavior of the cable in perturbations, and more generally the control laws for cable movement.

However, it transpires that the authors of this article are confronted with a fourth imponderable which proves to be, in fact, a major obstacle to the efficiency of such a system, namely the problem of drag of the cable itself in the upper layers of the atmosphere. This problem remains unsolved in the prior art.

OBJECTS OF THE INVENTION

An object of the invention is to provide a tethered satellite system which is autonomous, that is to say which enables orbit parameter regeneration without consumption of fuel. This object has the double advantage of offering an orbital system with a greatly extended life for an orbit of the tethered satellite at altitudes between 100 and 150 km, as well as optimum utilization of the satellizable payload, for example scientific equipment.

Another object of the invention is to provide orbit parameter regeneration by an autonomous method.

A more particular object of the invention is to provide a system and a method of electrodynamic propulsion to regenerate orbit parameters, and processes for implementing orbit regeneration and upper atmosphere measurement.

SUMMARY OF THE INVENTION

One aspect of the present invention is to provide an orbital system for injection into an orbit in the $F_2$ layer or the ionosphere during a limited period of time, this sytem comprising a main platform, a secondary satellite for deployment from said platform, a tether cable for tethering said satellite to said platform when said satellite is in the upper atmospheric layers and said platform is outside the atmosphere, winch means mounted at least on said platform for winding said cable in and out, electrical power supply means, a collector for ionosphere plasma electrons for connection to said platform, said satellite including an electron gun for emitting electrons into the ionosphere, said cable including at least a conductive portion, the system including means for connecting said conductive portion to said collector, said electron gun and said power supply means, in order to produce an electric current in said conductive portion when said system is in said $F_2$ layer of the ionosphere, said system being capable of adapting at least a measurement and a propulsion configuration, said satellite travelling in the upper atmospheric layers generally below said platform with said cable paid out to a first length when said system is in said measurement configuration, and said platform and said satellite both travelling in said $F_2$ layer of the ionosphere in said propulsion configuration, with said cable paid out to a second length.

According to a feature of a preferred embodiment of the invention control means are included for controlling actuation of said winch means in order to control systematic winding in and out of said cable.

Preferably, said control means includes means for controlling said winding selectively in synchronization with the orbiting system's angular oscillation in the orbital plane, in order to enable excitation and damping of said oscillation.

Another aspect of the invention is to provide a method of operating such an orbital system wherein said system is placed in an orbit such that it passes at least part of the time in the $F_2$ layer of the ionosphere, said winch means being operated to wind said cable out and deploy said satellite, said winch means being operated subsequently to wind said cable in synchronism with system natural frequency angular oscillations selectively to damp said oscillations.

Preferably, said winch means is operated selectively in synchronism with said oscillations to damp or to excite said oscillations enabling transfer between configurations in which said satellite is disposed respectively above and below said platform, said satellite being disposed above said platform in said propulsion configuration.

In this way, the problem of regeneration of the orbit parameters of a tethered satellite may be solved. The drag of the cable and the probe may be eliminated when the system is in the propulsion configuration. In the case of an east-bound orbit, the transfer of the satellite above the platform enables the complete system to be above the atmosphere in the propulsion configuration, even in a circular orbit, and therefore out of air drag.

The use of a double configuration with the transfer achieved by controlling the winching is applicable both for circular and eccentric orbits, either east-bound or west-bound.

DESCRIPTION OF THE DRAWINGS.

Other features and advantages of the invention will appear from the following description of an embodiment thereof, given by way of example with reference to the accompanying drawings, in which.

DESCRIPTION OF THE PREFERRED EMBODIMENT

Figure 1:
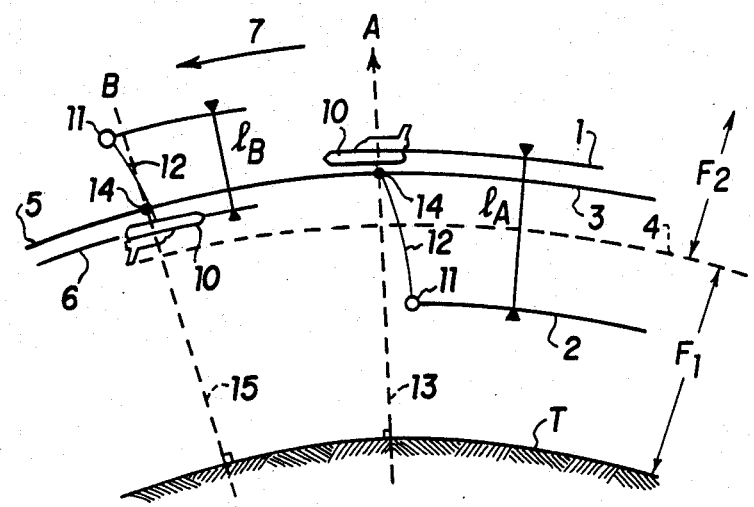
FIG. 1 is a diagram illustrating two orbital configurations for a tethered satellite in accordance with the invention.

FIG. 1 shows two configurations that the tethered satellite system can adopt in orbit:

configuration A enables the satellite to perform measurements in the upper layers of the atmosphere;

configuration B is the propulsion configuration.

In configuration A for measurement in the upper atmospheric layers, the main platform 10 orbits at a higher orbit 1 than the orbit 2 of the secondary satellite 11 which has been deployed from the platform 10 while remaining tethered thereto by a cable 12. The upper limit of the high atmosphere surrounding the earth T, which may be defined for example as the zone where significant drag is experienced by the cable 12 as well as the secondary satellite 11 which are immersed in it in configuration A, is indicated by a dotted line 4.

The cable 12 extends substantially in the direction of the local vertical 13, while counteracting the effect of drag on the lower part of the cable 12 and on the secondary satellite 11, which project into the "high atmosphere".

The same orbital system can be brought, in accordance with this embodiment of the invention into the propulsion configuration B after swinging in the orbital plane about its centre of mass 14.

In the propulsion configuration B, the secondary satellite 11 orbits at a higher orbit than the orbit 6 of the main platform 10. Moreover, the whole orbital system, comprising the main platform 10, the tether cable 12 and the secondary satellite 11, orbits above the high layers of the atmosphere indicated by the dotted line 4 and is therefore subjected to a drag which is negligeable or substantially zero.

By the law of conservation of inertia, the centre of mass 14 of the system orbits on the same orbit 3 whatever the configuration adopted.

It will be noted that, in the preferred embodiment of the invention, the length $L_R$ of the tether cable 12 in the propulsion configuration B is less than its length $L_A$ when the system is in configuration A for measurement in the upper layers of the atmosphere.

It will also benoted that the direction 7 of the orbital revolutions remains the same, whether the orbiting system is in configuration A and B or an intermediate configuration.

Moreover, the stable configuration B of the orbiting system corresponds substantially to alignment of the cable on the local vertical 15 relative to the earth T symmetrically with the stable configuration A.

In the normal way, the secondary satellite 11, used as a probe in the configuration A for measurements in the upper layers of the atmosphere includes suitable measurement devices. Moreover, in order to provide better control of the oscillation movements of the orbiting system in the orbit plane, as discussed below, the secondary satellite may also include winch means. This particularly enables better control of the linear longitudinal variations (alternating) in the length of the cable, used either to excite pendulum motion of the orbiting system, or to damp it.

It is possible and advantageous to make the cable 12 of a material having a high breakage resistance. It is also an advantage to use a cable whose thickness is progressively reducing, since the longitudinal loads to be supported by the cable decrease closer to the secondary satellite 11.

Figure 5:
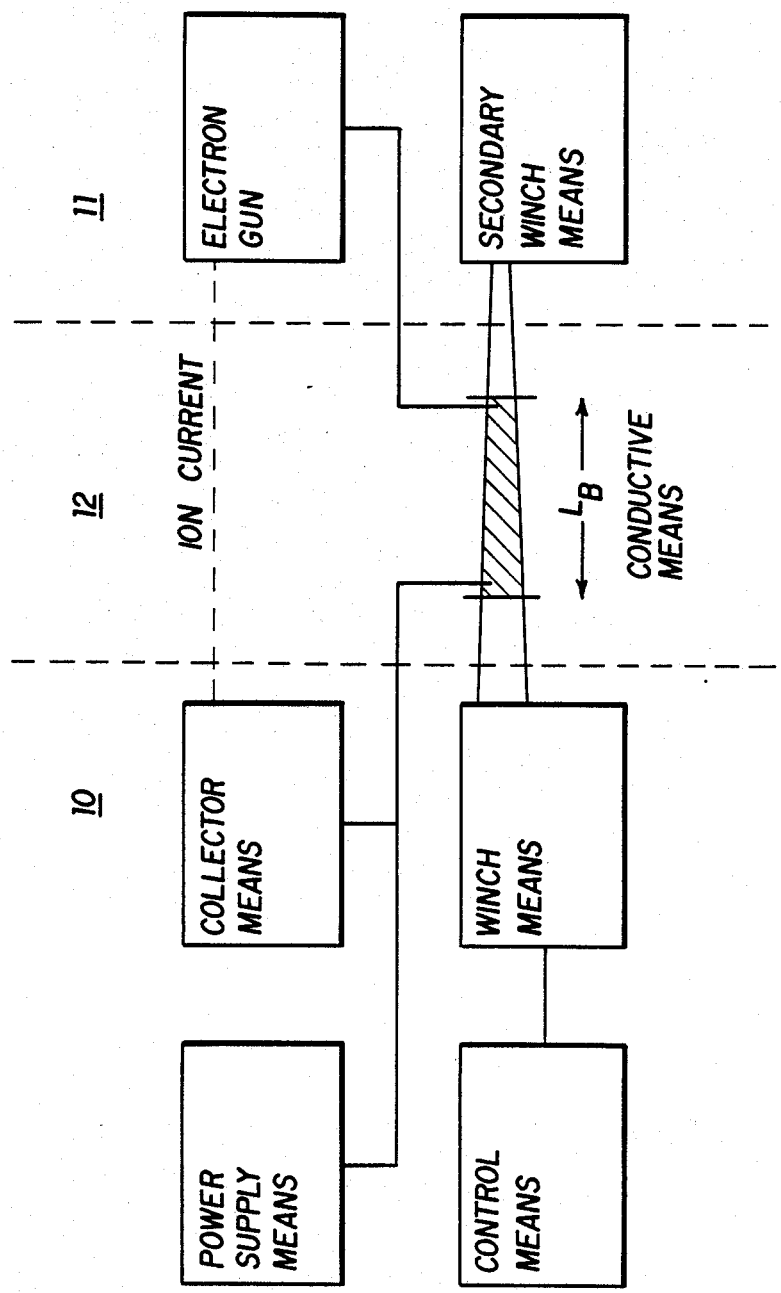
FIG. 5 is a block diagram of the ion coupling in the system.

Also, in this embodiment of the invention, the tether cable is made so that it can fulfill alternately the specific functions required for configurations A and B respectively. In the measurement configuration A, the legnth $L_A$ of the tether cable is relatively long and corresponds to virtually complete unreeling of the main or secondary winches, or both of them. However, in the propulsion configurations B, part of the tether cable 12 is preferably wound onto the main or secondary winches or both as shown in FIG. 5. Also, the part left deployed, of length $L_B$ must be electrically conductive between the means for electro-ionic coupling with the plasma environment. It is possible for these coupling means to comprise an electron gun forming an emitter and a metallised balloon exposed to the ionosphere plasma forming a collector of electrons.

With a view to economising the use of conductive material in the tether cable 12, for example in order to achieve reductions in embarked weight the part of the cable not deployed in the propulsion configuration B may be electrically non-conductive. Thus in a preferred embodiment of the cable 12, the conductive part is formed of a composite of copper and Kevlar fibres, these two materials having the advantage of equivalent modulus of elasticity.

The non-conductive part of the cable 12 may be made of finely woven Kevlar, since it only serves as a mechanical connection.

In the case where the secondary satellite 11 comprises secondary winch means, suitable for winding up part of the cable for the propulsion configuration B, the tether cable 12 is made advantageously with a conductive mid-portion of approximately length $L_B$ extended at each end by respective non-conductive portions which will each be wound onto the winches of the main platform 10 and the secondary satellite 11, respectively. Because the distribution of load along the cable is nonuniform in the maximum deployment configuration A, each portion of the cable thus defined may have a different diameter, decreasing from the platform 10 towards the secondary satellite 11, and may even decrease continuously along one or more of the portions, in order to maximize weight-saving.

The fully-deployed length $L_A$ of the cable 12 and the length of the conductive portion $L_B$ are determined by the structure of the atmospheric layers to be encountered. The high atmosphere, which generates drag and of which it is useful to measure the characteristics by a probe, may be considered to extend from 120 to 150 km in altitude. The $F_2$ layer of the ionosphere, which presents conductivity characteristics enabling use of the cable in electro-dynamic propulsion, extends between 250 and 500 km approximately. It follows that, in the preferred embodiment, the deployed legnth $L_A$ of the cable in the measurement configuration may usefully attain up to about 200 km with a reduction to a length of $L_B$ of about 50 km in propulsion configuration.

In a preferred embodiment as shown in FIG. 5, with a view to producing current passing through the conductive part of the cable, when the system is in the electro-dynamic propulsion configuration, the main platform is provided with a power source which conveniently comprises solar panels. Also, the platform 10 comprises energy storage means able to accumulate both solar energy picked up by the solar panels and also in suitable cases, electrical energy generated in the tether cable produced by the displacement of the deployed orbiting system through the geo-magnetic field when the system is not in propulsion configuration. Advantageously, the energy storage means may comprise counter-to-rotating flywheels.

It will be appreciated that, by Ampere's rule, the direction of action of the electrodynamic force generated in the cable will depend on the direction that the current flows in it. East-bound satellite missions require flow the current i in the cable in a radially positive direction (see equation (a)) that is to say towards the earth. Thus, the interaction of this current with the geomagnetic flux B directed northwards produces an eastward thrust.

Conversely for west-bound missions, the same orbital system may be used, with an electron gun on the secondary satellite 11 and the metallized balloon exposed to the plasma on the platform, while maintaining the measurement configuration in which the secondary satellite orbits beneath the main platform orbit. In this situation the unfavorable drag effect can only be reduced by giving the orbiting system an eccentric orbit. Such an eccentric orbit will have a perigee such that the secondary satellite can probe into the upper layers of the atmosphere in order to make measurements, the apogee being chosen so as to optimise the useful time spent in the $F_2$ plasma layer necessary to regenerate the orbit parameters by electro-dynamic propulsion.

The orbital system described above may therefore be used in various ways.

A first usage consists in placing the orbital system on a circular orbit. In this case two different phases may be distinguished in each mission, firstly a phase of measurement of the upper atmospheric layers, in which the orbital system is in the measurement configuration, and secondly a phase of orbit parameter regeneration, in which the orbital system is in the electrodynamic propulsion configuration. The secondary satellite 11 is then alternately placed in an orbit beneath and an orbit above the orbits of the main platform by means of the transfer procedure described herein, comprising exciting and then damping oscillation.

A seocnd usage consists of placing the orbital system on a slightly eccentric orbit.

This second usage has several advantages. Firstly it enables measurements to be made in the upper atmosphere at different altitudes, and then it causes a reduction in the drag effect one each revolution. Another advantage results from the fact that the degradation of an eccentric orbit produces a significant reduction of the apogee, while the perigee stays almost constant until the end. Consequently, if the orbital system is placed in propulsion configuration, the tether may be electrically activated only in the zone of the orbit perigee, that is to say the zone where the orbital system has been subjected to a heavy drag during its passage in measurement configuration. This compensation restores the eccentric orbit directly, without any other correction maneuver being necessary.

It will be remembered that because of the direction of current flow chosen in the cable, the configuration called "propulsion" is only operational for east-bound orbits, as explained above.

Transfer from the measurement configuration to the propulsion configuration requires the control laws for the oscillatory motion of the orbital system about its center of mass to be defined. To this end, a mathematical model has been formulated, using the following assumptions (see FIG. 2).

It is assumed initially that the deployed orbital system consists of two point masses (the main platform and the secondary satellite) connected by a cable whose own mass is non-negligible. Thus a 200 km length of cable capable of accepting the tensile stress has a mass of about 3 tonnes which is therefore comparable with the mass of the platform. It is also assumed that the orbital system is not subjected to lateral deflection (or at most that it is negligeable relative to the length of the cable)

which corresponds to assuming that the cable extend in a straight line. Also, the calculations are made for an orbit in the equatorial plane (inclination 0°) for which the geo-magnetic flux B is more or less orthogonal to the orbit lane and is directed northwards.

Figure 2:
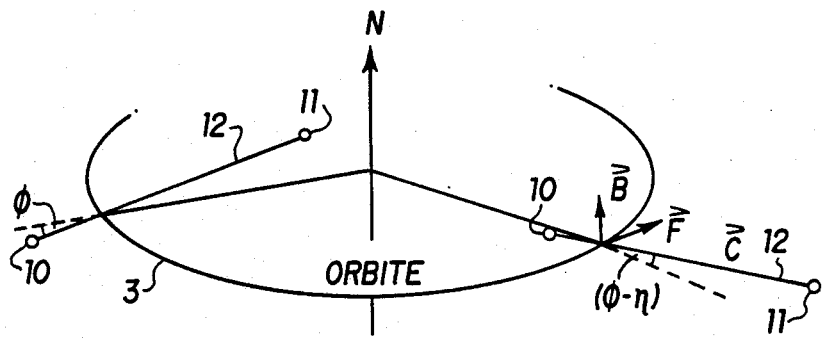
FIG. 2 is mathematical model diagram illustrating the parameters of oscillation control laws in orbit.

A model of the behavior of the system is obtained by establishing:

the law of equilibrium of the moments of the system, which corresponds to equalizing the moments of inertia of the system and the moments generated by gravitational forces, drag, and induced electro-magnetic forces;

Newton's law of equilibrium of forces, from which radia and angular accelerations of the pendulum system about its center of mass can be deduced:

the natural frequency of the system, which may be written as:

$$\phi'' + 1.5 \sin 2\phi = 0 \tag{2}$$

where $\phi$=deflection of the cable from the local vertical (see FIG. 2).

Figure 3:
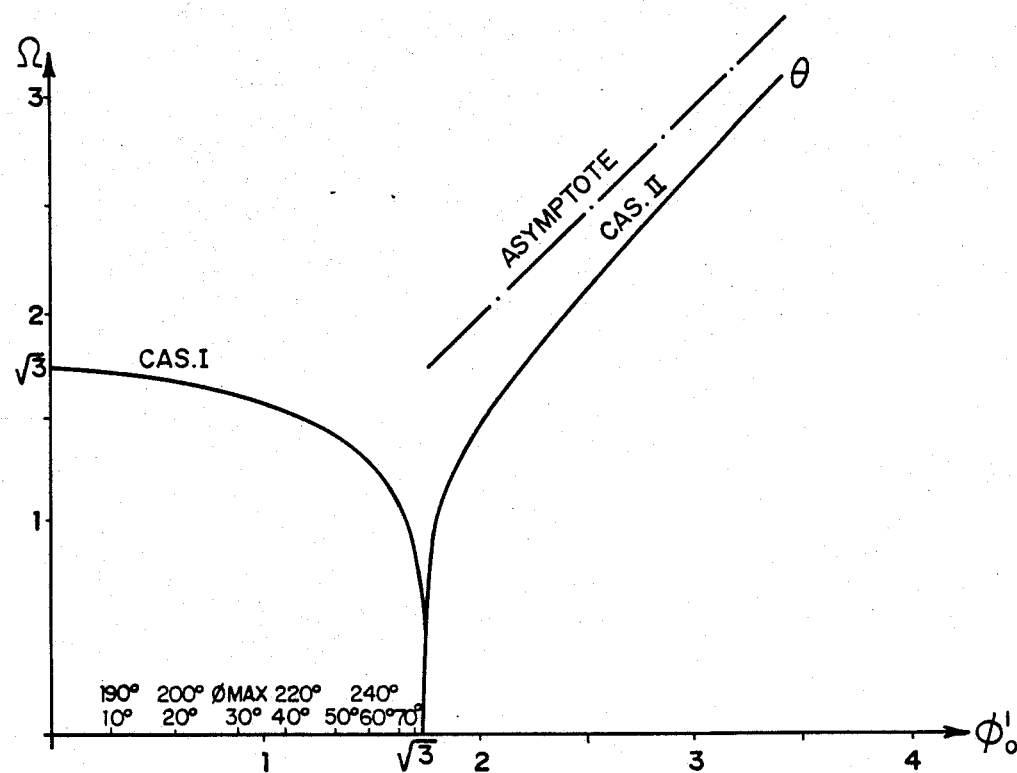
FIG. 3 is a graph illustrating the variation of the natural frequency of oscillation of the orbital system about its centre of mass as a function of the angular amplitude of the oscillations.

FIG. 3 shows the variation of the natural frequency of the orbital system (relative to the orbital frequency)$\Omega$, as a function of its angular velocity $\phi o'$ in oscillation about its center of mass. The discontinuity for $\phi_o' = \sqrt{3}$ corresponds to the transition between the pendulum oscillation mode (case 1) and the complete rotation mode (case 2).

For the oscillatory mode (case 1), the abscissa also shows the angular amplitudes $\Phi M$ corresponding to each value of $\phi o'$. It can be seen that, for small amplitudes, the natural frequency of the orbital system is equal to 3 times the orbital frequency.

Because the moment of inertia of the deployed orbital system is relatively high, the pendulum oscillations are relatively slow, which enables them to be controlled readily without requiring a rapid dynamic response from the control system.

In this embodiment of the invention, the transfer from the measurement configuration to the propulsion configuration and conversely is obtained by means of excitation and damping of the oscillation motion of the orbital system about its center of mass by synchronized action on the length of the tether cable by means of the winches.

Thus four control laws can be defined enabling the basic maneuvers to be performed:

a law for excitation of the orbital system at its natural oscillation frequency in the orbit plane, consisting of producing variations in the cable length, controlled by alternating operation of the winches, in resonance with the instantaneous natural frequency of the oscillating orbital system;

a law for damping the pendulum oscillations consisting of varying the length of the cable out of phase relative to the oscillation frequency of the orbital system;

a law for the system behavior at constant cable winding speed (including zero winding speed);

a law for the smooth and stable transition from the excitation law to the damping law.

Figure 4:
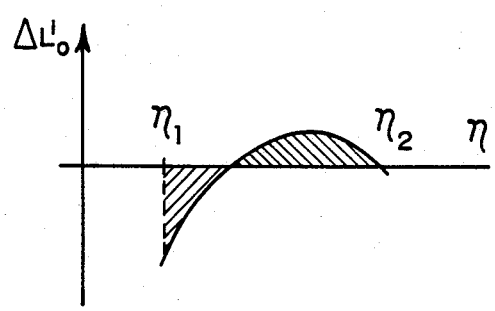
FIG. 4 is a graph of a possible control law for longitudinal movement of the tether cable for transition between the phase of increasing angular amplitude of oscillation of the orbital system and the phase of damping the oscillations.

This transition law must in fact enable both negative and excessive positive tension in the cable. FIG. 4 shows one possible mode in which the variation $\Delta l_o'$ of the cable length follows a parabolic law, expressed as a function of the angle, $\eta$ representing the position of the orbital system by its argument.

On the basis of the characteristics mentioned above for the orbital system, as well as the process for transferring the system from a measurement configuration to a propulsion configuration and back, an example has been calculated to demonstrate feasibility.

The starting assumptions for this study were a main platform of a mass of 2000 kg, having a solar panel of 100 m$^2$, a satellite of 200 kg, a uniform cable which is conductive throughout its length of 200 km and has 2 mm diameter (Kevlar/copper). The orbital system is considered to be placed in a slightly eccentric orbit with an initial perigee of 263 km altitude and an apogee of 663 km, the orbit being equatorial, and east-bound corresponding to a launch from French Guyana, for example.

The probe measurement altitude (in measurement configuration) is 130 km.

It has been found that, by dividing the mission into cycles of 62 revolutions (approximately 4 days), of which 5 revolutions (approximately 8 hours) are in measurement configuration and the rest in propulsion configuration, the orbital parameters are permanently restored. The only sources of energy used are solar energy and the geo-magnetic field. The length of the cable is reduced to 50 km in propulsion configuration.

The transfer from one configuration to another is performed in six successive phases for each cycle:

1°. Measurement configuration: during 5 successive revolutions, the probe orbits between 130 km and 517 km altitude and experiences drag which degenerates the orbital parameters of the system. The system is controlled by the damping law which maintains a cable deflection less than 1° to the local vertical, and consumes about 4 kW to vary the cable length between 200 and 212 km. In accordance with the law of degeneration of eccentric orbits, the perigee remains almost constant.

2°. Preparatory phase to the excitement of oscillations which will transfer to the propulsion mode: the cable length is reduced from 200 km to 115 km under the control of the law of winding in at constant speed. The maximum power required is 10 kW.

3°. Phase of swinging the orbital system:
consists in applying the excitation law for oscillations of the orbital system, which requires 20 kW maximum. To stabilize the secondary satellite on an orbit higher than that of the main platform, the mode of oscillation damping is next applied leading to an increase of the cable to 128 km. The cable is then rewound at constant speed until a deployed length of 60 km is obtained and a further damping phase applied.

4°. Phase of regeneration of orbital parameters: in a zone of 40° about the perigee, the cable is supplied with an electric current of 3 A, producing a mean electrogeomagnetic thrust of 4.1 N. Only a small part of this thrust is cancelled by drag in the vicinity of the perigee, the residual energy serving to restore the orbit energy.

The area of 100 m$^2$ of the solar panels corresponds to the electrical energy requirements for the cable, after taking account of the alternating periods of sunlight and darkness.

5°. Phase of returning to the measurement configuration: consists in again applying the law of cable excitation, follows by the damping law, which results in a big reduction in the cable length at the end of the phase.

6°. Preparatory phase for further measurements: the cable is brought to its full operational length according to the law of constant speed winding. The oscillations generated are then damped with the corresponding law until the cable extends substantially vertically.

This example, which demonstrates the feasibility of the technique has been calculated on the basis of very conservative assumptions. It is therefore possible to improve the performance of such a system, particularly by using a cable which is not totally conductive, and which has a decreasing diameter.

In any case, it has been demonstrated that it is possible to produce an orbital system for measurement in the upper atmospheric layers which is autonomous, the regeneration of the orbital parameters being obtained only by using solar energy and the geo-magnetic field.

I claim:

1. An orbital system for injecting into a temporary orbit in the $F_2$ layer of the ionosphere, comprising a main platform, a secondary satellite for deployment from said platform, a tether cable for tethering said satellite to said platform when said satellite is in the upper atmospheric layers and said platform is outside the atmosphere, winch means mounted at least on said platform for winding said cable in and out, electrical power supply means, a collector for ionosphere plasma electrons for connection to said platform, said satellite including an electron gun for emitting electrons into the ionosphere, said cable including at least a conductive portion, said conductive portion being extended at its end adjacent said platform by a non-conductive portion, the sytem including means for connecting said conductive portion to said collector, said electron gun and said power supply means, in order to produce an electric current in said conductive portion when said system is in said $F_2$ layer of the ionosphere, said system being capable of adapting at least a measurement and a propulsion configuration, said satellite travelling in the upper atmospheric layers generally below said platform with said cable paid out to a first length when said system is in said measurement configuration, and said platform and said satellite both travelling in said $F_2$ layer of the ionosphere in said propulsion configuration, with said cable paid out to a second length.

2. An orbital system as claimed in claim 1, and including control means for controlling actuation of said winch means in order to control systematic winding in and out of said cable.

3. A system as claimed in claim 2, wherein said control means includes means for controlling said winding selectively in synchronization with the orbiting system's angular oscillation in the orbital plane in order to enable excitation and damping of said oscillation.

4. A system as claimed in claim 3, wherein said control means includes means for sequencing said excitation and damping together with constant winding in and out, in order to invert said orbital system and enable said system to pass from said measurement configuration to a propulsion configuration in which said satellite is disposed generally above said platform in the $F_2$ layer of the ionosphere.

5. A system as claimed in claim 1, wherein said collector comprises a metallized balloon.

6. A system as claimed in claim 1, wherein said winch means includes means mounted on said satellite and said conductive portion of said cable is extended at its end adjacent said satellite by a non-conductive portion.

7. A system as claimed in claim 1, wherein said conductive portion comprises a composite including copper and Kevlar.

8. A system as claimed in claim 1, wherein the length of said conductive portion is at least 50 km, and the total length of said cable is substantially equal to 200 km.

9. A system as claimed in claim 1, wherein said power supply means includes solar panel means, and energy recovery and storage means for recovering energy during unwinding of said cable and storing the recovered energy for use during winding in.

10. A method of operating an orbital system having a platform connected by a cable to a satellite, comprising the steps of:
    (a) placing the system in orbit;
    (b) passing the system at least part of the time in an $F_2$ layer of the ionosphere;
    (c) operating a winch means to wind the cable out to deploy the satellite;
    (d) subsequently selectively operating said winch means to wind the cable in synchronism with the systems natural frequency angular oscillations to dampen said oscillations; and
    (e) further selectively operating said winch means in synchronism with said oscillations to dampen or to excite the oscillations thus enabling a transfer between a propulsion and a measurement configuration in which the satellite is disposed above and below said platform respectively, said satellite being disposed above said platform with said system passing in the $F_2$ layer of the ionosphere to substantially eliminate air drag on said cable in the propulsion configuration.

11. A method according to claim 10, further comprising the step of operating said winch means at a generally constant speed in order to transfer said system between a propulsion and a measurement configuration, to extend or retrieve the cable, and to stabilize the configurations.

12. A method according to claim 11, further comprising the step of selectively passing a current through the cable when the system is in the vicinity of its perigee and in the propulsion configuration.

13. A method according to claim 10, further comprising the step of actuating said winch means in a sequence such that the cable is continuously subjected to a positive tension substantially less than the breaking limit of the cable.

14. A method according to claim 10, further comprising the step of placing the center of mass of the system on a generally circular eastbound orbit at an altitude between 200 and 300 km.

15. A method according to claim 10, further comprising the step of placing the center of mass of the system on a generally elliptical westbound orbit whose perigee is at an altitude between 200 and 350 kms.

* * * * *